United States Patent [19]

Kavesh

[11] Patent Number: 4,784,820
[45] Date of Patent: Nov. 15, 1988

[54] PREPARATION OF SOLUTION OF HIGH MOLECULAR WEIGHT POLYMERS

[75] Inventor: Sheldon Kavesh, Whippany, N.J.

[73] Assignee: Allied-Signal Inc., Morris Township, Morris County, N.J.

[21] Appl. No.: 895,396

[22] Filed: Aug. 11, 1986

[51] Int. Cl.$^4$ .................. B29C 47/10; B29C 47/36
[52] U.S. Cl. .................. 264/349; 264/176.1; 264/211.21; 264/211.22; 264/211.23; 366/76; 523/322
[58] Field of Search .............. 264/211.21, 211.22, 264/211.23, 331.17, 176.1, 349; 523/322; 366/76, 79

[56] References Cited

U.S. PATENT DOCUMENTS

| | | | |
|---|---|---|---|
| 3,415,925 | 12/1968 | Marans | 264/331.17 |
| 3,923,947 | 12/1975 | Cook | 264/331.17 |
| 4,130,618 | 12/1978 | Hill | 264/331.17 |
| 4,344,908 | 8/1982 | Smith et al. | 264/203 |
| 4,430,383 | 2/1984 | Smith et al. | 428/364 |
| 4,440,711 | 4/1984 | Kwon et al. | 264/185 |
| 4,545,950 | 10/1985 | Motooka et al. | 264/210.6 |
| 4,551,296 | 11/1985 | Kavesh et al. | 264/177 F |
| 4,668,717 | 5/1987 | Lemstra et al. | 523/322 |

FOREIGN PATENT DOCUMENTS

| | | |
|---|---|---|
| 0183285 | 6/1986 | European Pat. Off. |
| 59-223307 | 12/1984 | Japan. |
| 60-34614 | 2/1985 | Japan. |
| 60-52326 | 3/1985 | Japan. |

Primary Examiner—Jan H. Silbaugh
Assistant Examiner—Hubert C. Lorin
Attorney, Agent, or Firm—Richard A. Anderson

[57] ABSTRACT

Solutions of high molecular weight polymers, such as ultrahigh molecular weight polyolefins are prepared, by forming a slurry of particles of the polymer in a solvent for the polymer, then transferring the slurry to a pumping device, then pumping the slurry under pressure to insure positive displacement to a screw extruder, and maintaining the slurry in the screw extruder for sufficient residence time at sufficient temperature so that a homogeneous solution is formed, then conveying the solution with the screw extruder to metering device which can feed a spinnerette, or a film-forming or tape-forming slit extruder.

9 Claims, No Drawings

PREPARATION OF SOLUTION OF HIGH MOLECULAR WEIGHT POLYMERS

BACKGROUND OF THE INVENTION

Several processes for the solution spinning of high molecular weight polymers have been described in the prior art. The solution spinning of high molecular weight polyethylene for example, has been described in U.S. Pat. Nos. 4,551,296; 4,344,908 and 4,430,383, all of which are hereby incorporated by reference. The solution spinning of high molecular weight polyvinyl alcohol was described in U.S. Pat. No. 4,440,711. In each of these processes a homogeneous solution of the high molecular weight polymer in the solvent is required.

The preparation of homogeneous solutions of high molecular weight polymers is not a trivial art. U.S. Pat. No. 4,344,908 describes only a batchwise (discontinuous method). U.S. Pat. No. 4,430,383 is totally silent on a method and means of preparing the polymer solution. Some of the difficulties of preparing a high molecular weight polymer solution have recently been discussed in Japan, Kokai patent publication No. 52326-1985 as follows:

"Now, in the production of the above mentioned gel fiber, the extrusion spinning apparatus similar to those used in the common melt spinning is used; however, in this case, the greatest difficulty lies in the preparation of homogeneous spinning solution of required concentration. Thus, in order to obtain the homogeneous spinning solution, the synthetic polymer and the solvent are placed in a mill at a temperature near the decomposition temperature of the synthetic polymer and this has to be stirred and mixed for a long time. However, even with this, homogeneous dissolving of the synthetic polymer into the solvent cannot be achieved adequately in many cases. Particularly, in order to obtain the high strength, high modulus fibers, one needs the synthetic polymer of ultrahigh molecular weight and, in this case, dispersion and dissolving of the synthetic polymer into the solvent is even more unhomogeneous. Also, at the time of dissolving, the solution viscosity rises and mixing of gas bubbles cannot be avoided in the stirred mixing process. The lumps of molecules which remain undissolved, mixing of gas bubbles, and the nonhomogeneity of the solution tie to the instability in yarn making in the spinning process and, in some cases, they make the yarn making impossible. Also, the resulting final fibers have inferior quality."

"As to the past technology for resolving these shortcomings, there is the method of spinning in which a plural number of dissolving tanks are installed in the solution spinning process and powerful stirring in the first dissolving, second dissolving—and long dissolving time are used to achieve the homogeneous dissolving; then, while keeping the solution at a high temperature, the solution is fed to a screw type extruder for spinning. In this dissolving method, homogeneous solution of certain extent of homogeneity can be obtained but the dissolving takes a long time. Particularly, in order to obtain the high strength, high modulus, high toughness fiber, it is necessary to use the synthetic polymer of ultrahigh molecular weight but, in the case of the ultrahigh molecular weight polymers, the dissolving needs to be done at high temperature for a long time; as a consequence, a large drop in the molecular weight of the synthetic polymer is induced. Particularly in the dissolving tank method, homogeneous dissolving is achieved by powerful stirred mixing and, consequently, mixing of fine gas bubbles into the solution cannot be avoided. Thus, the dissolving tank method has numerous shortcomings, such as the need for installing multiple stage dissolving tanks, long time needed for the dissolving, severe drop in the molecular weight of the synthetic polymer, and easy mixing of gas bubble. Furthermore, when the dissolved solution made by such conventional method is fed to the spinning process, stable spinning for long time cannot be achieved, and the resulting fibers have inferior quality and so the process is not adequate for industrial production."

Kokai patent publication No. 52326-1985 described a complex procedure to avoid those problems. In their method the polymer is first dissolved in a solvent and then is cooled to make gel particles containing the solvent. The gel particles are dispersed or dissolved in the same or different solvent, and the dispersion or solution is fed to the spinning extrusion apparatus.

Other complex solution preparation procedures are described in Japan, Kokai patent publication No. 34614-1985 and Japan, Kokai patent application No. 223307-1984. In a related vein U.S. Pat. No. 4,545,950 describes a complex process involving melt kneading of a high molecular weight polymer with a wax, followed by melt extrusion.

By extruding device is meant herein a spinnerette, or extruder for film or tape or other extruders which form articles from solutions of high molecular weight polymers.

The method of continuously preparing solutions of high molecular weight polymers described in U.S. Pat. Nos. 4,551,296 and 4,440,711, hereby incorporated by reference, is somewhat less complex. This method consists of:

a. Forming a slurry of the high molecular weight polymer in a solvent.
b. Transferring that slurry to an intensive mixing device in which the residence time, agitator speed, and temperature is sufficient to convert the slurry to a solution.
c. Transferring the solution of this high polymer to an extrusion device to deliver polymer solution at a reasonably high pressure to a metering (gear) pump.

SUMMARY OF THE INVENTION

It is a purpose of the present invention to provide a more simple, more economic, less capital intensive method and apparatus for continuously preparing for extrusion or spinning solutions of high molecular weight polymers than has been provided by the prior art.

The method consists of:

a. Forming a slurry of particles of the high molecular weight polymer in a solvent for the polymer.
b. Transferring that slurry to a pumping device and thence, under sufficient pressure to insure positive conveyance, to a screw extruder.
c. Maintaining the slurry in the screw extruder for sufficient residence time and at a sufficient temperature that a homogeneous solution of the polymer is formed, and then this solution is conveyed by the screw extruder under pressure to a metering device.

The high molecular weight polymers used in this invention can be any which can be solution spun by forming solutions from particles. For example, ultrahigh molecular weight polyolefins, particularly polyethylene. The ultrahigh molecular weight polyethylene would have a molecular weight of from between about 300,000 to about 7,000,000. However, the polymer may be any selected from the group consisting of polyolefins, polyvinyl alcohol, polyacrylonitrile and nylon-6.

The preferred temperature in the screw extruder is between about 150° C. and 300° C. The preferred residence time in the screw extruder is between about 3 minutes and 1 hour. The preferred pumping device for the slurry is a positive displacement pump, particularly a piston pump. It is preferred that the pressure at the discharge of the piston pump be between about 50 and 1500 psig ( 0,34 to 10.3 mega pascals).

The preferred pressure at the discharge of the metering pump is between about 100 and 2000 psig ( 0.7 to 13.8 mega pascals).

The invention will be illustrated by the following examples.

COMPARATIVE EXAMPLE 1

A fifteen-gallon drum equipped with a three-inch diameter propeller agitator was charged with eight gallons of white mineral oil (specific gravity 0.877), 1693 grams linear polyethylene having an intrinsic viscosity of 26 dl/grams measured in decalin at 135° C. and 141 grams of Shell "Ionol" antioxidant. The mixture was agitated at 1725 rpm to form a uniform dispersion of slurry of the polymer and antioxidant in the mineral oil.

The bottom opening of the drum containing the slurry was connected to a centrifugal pump and thence to a single screw extruder of three-inch (7.6 cm) ID barrel diameter and 3700 cubic centimeters net internal volume.

The temperature of the screw extruder was maintained at 290° C. along its length. The discharge end of the screw extruder was fitted with a pressure measuring device and was connected to a Zenith Gear pump having a displacement of 10 cubic centimeters/revolution.

With the extruder operating at 100 rpm screw speed, and the gear pump operating at 20 rpm, the centrifugal pump was turned on to deliver the polymer slurry to the extruder at a feed pressure of 10 psi. After a period of 60 minutes to permit equilibration of the system, the following measurements and observations were made.

The rate of discharge of material from the gear pump was measured by collecting and weighing one minute timed samples. The rate of discharge was highly variable ranging from 10 to 50 grams per minute or approximately 7 to 35 percent of the pumping capacity of the gear pump at the temperature of the discharge. The pressure at the discharge end of the screw extruder ranged from 20 to 70 psi. Examination of the extrudate showed that the concentration of the polymer and degree of dissolution of the polymer in the extrudate was highly variable. A homogeneous solution had not been prepared. The above described situation persisted even when the extruder screw speed was varied from 20 rpm to 400 rpm, and the barrel temperature was varied from 200° to 290° C.

While the cause of the failure of the extruder to convey and dissolve the polymer slurry is not known with certainty, it is believed that the problem is associated with the relatively low viscosity of the initial slurry and the relatively very high viscosity of the high molecular weight polymer solution. The screw extruder is believed unable to develop enough pressure at the feed end to uniformly convey the low viscosity slurry against the resistance in the transition (dissolving) zone. This problem is overcome by the method of the invention as illustrated in the following examples.

EXAMPLE 2

A 6 weight percent slurry of 26 IV polyethylene was prepared as in comparative Example 1. The bottom opening of the drum containing the slurry was connected to a positive displacement Milton Roy "Milroyal" piston pump with a pumping capacity of 820 $cm^3$ per minute at 100 percent stroke length. The piston pump was connected to feed slurry to the same single screw extruder as in comparative Example 1. The temperature of the screw extruder was set at 290° C. along its length.

With the extruder operating at 100 rpm screw speed and the gear pump operating at 20 rpm, the piston pump was turned on at 23 percent of maximum stroke length to deliver the polmer slurry to the extruder at the rate of 190 $cm^3$ per minute. After a period of 60 minutes to permit equilibration of the system, the following measurements and observations were made.

The rate of discharge of extrudate from the gear pump was 140±3 grams per minute, corresponding to 100 percent of the capacity of the gear pump at the temperature of the discharge. The pressure at the discharge of the piston pump was 200 to 250 psig. The pressure at the discharge end of the screw extruder was 400 to 425 psig. Examination of the extrudate showed that the concentration of the polymer was uniform and that dissolution was complete.

EXAMPLE 3

A 20 weight percent slurry of a 9.7 IV polyethylene was prepared in a similar manner to that described in comparative Example 1. The slurry was fed to the piston pump and thence to the same screw extruder as described in Example 2. The temperature of the screw extruder was set at 300° C. along its length.

With the extruder operating at 10 rpm screw speed and the gear pump operating at 27 rpm, the piston pump was turned on at 30 percent of maximum stroke length to deliver the polymer slurry to the extruder at the rate of 246 $cm^3$ per minute. After a period of 60 minutes the rate of discharge of extrudate from the gear pump was 189±5 grams per minute, the pressure at the discharge of the piston pump was 400 to 450 psig and the pressure at the discharge end of the screw extruder was 530 to 600 psig. Examination of the extrudate showed that the concentration of the polymer was uniform and that dissolution was complete.

I claim:
1. A method to prepare homogeneous solutions for extrusion of high molecular weight polymer comprising
   forming a slurry of particles of the high molecular weight polymer in a solvent for the polymer, then
   transferring said slurry to a positive displacement pump, then
   pumping said slurry with said positive displacement pump under sufficient pressure to insure positive conveyance to a screw extruder, then
   maintaining said slurry in said screw extruder for sufficient residence time and at a sufficient temperature so that a homogeneous solution of the polymer is formed, then conveying said solution with a metering pump to an extruding device.

2. The method of claim 1 wherein said polymer is an ultrahigh molecular weight polyolefin.

3. The method of claim 2 where said olefin is polyethylene having a molecular weight of from between about 300,000 to about 7,000,000.

4. The method of claim 1 wherein the polymer is selected from the group consisting of polyolefins, polyvinyl alcohol, polyacrylonitrile and nylon-6.

5. The method of claim 1 wherein the temperature in said screw extruder is between about 150° C. and 300° C.

6. The method of claim 1 wherein the residence time in said screw extruder is between about 3 minutes and about 1 hour.

7. The method of claim 1 wherein said positive displacement pump is a piston pump.

8. The method of claim 7 wherein the pressure at the discharge of said positive displacement pump is between about 50 and 1500 psig (0.34 to 10.3 mega pascals).

9. The method of claim 1 wherein the pressure at the discharge of said metering pump is between about 100 and 2000 psig (0.7 to 13.8 mega pascals).

* * * * *